Oct. 7, 1924.

W. E. BLAND

AUTOMOBILE SIGNAL 1,510,974

Filed Feb. 16, 1922   2 Sheets-Sheet 1

William E. Bland.

By Harry P. Schwder

Attorney

Oct. 7, 1924.
W. E. BLAND
MOBILE SIGNAL
Filed Feb. 16, 1922
1,510,974
2 Sheets-Sheet 2
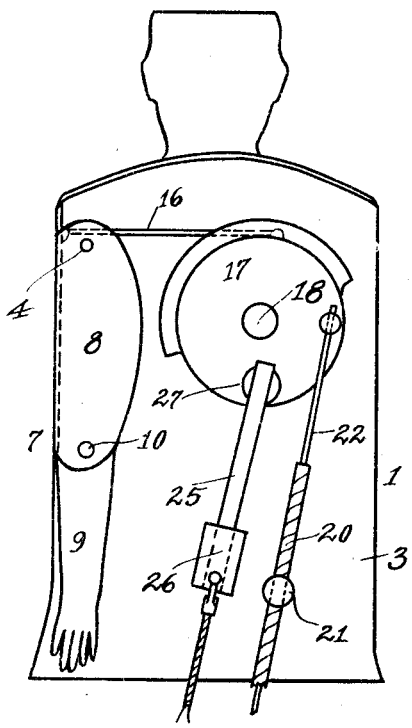
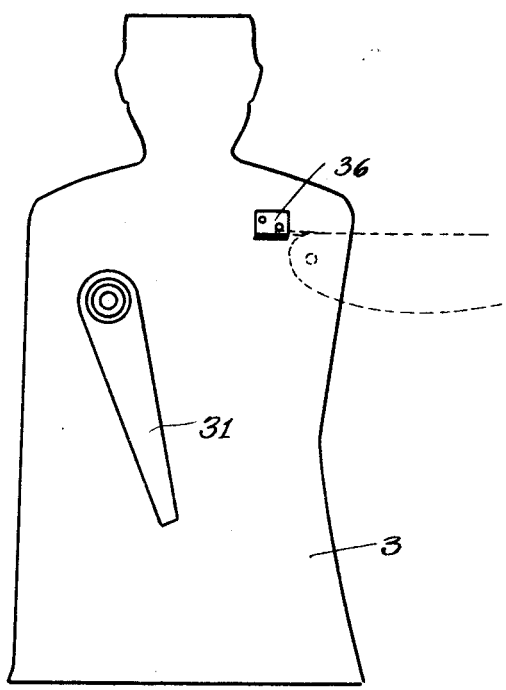
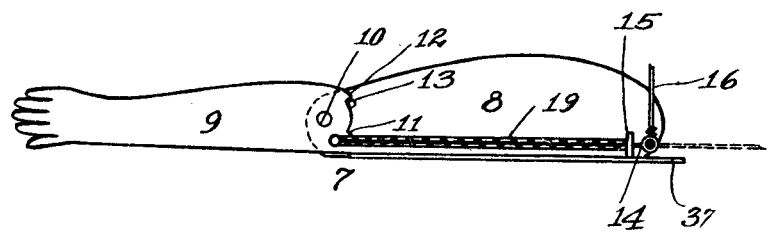
Inventor
William E. Bland.
By Harry C. Schroeder
Attorney

AUTOMOBILE SIGNAL.

Application filed February 16, 1922. Serial No. 536,849.

*To all whom it may concern:*

Be it known that I, WILLIAM E. BLAND, a citizen of the United States, residing at Berkeley, in the county of Alameda and State of California, have invented certain new and useful Improvements in Automobile Signals, of which the following is a specification.

My invention is an improved automobile signal comprising a signal arm in the form of a human arm and means for swinging said arm into the various standard signalling positions of the human arm.

Referring to the annexed drawings in which my invention is illustrated and which forms a part of this specification:

Figure 4 is a rear view of my signal with the rear frame plate removed.

Figure 5 is a front view of my signal.

Figure 6 is a front view of the signal arm swung into horizontal or left turn position.

Figure 1:
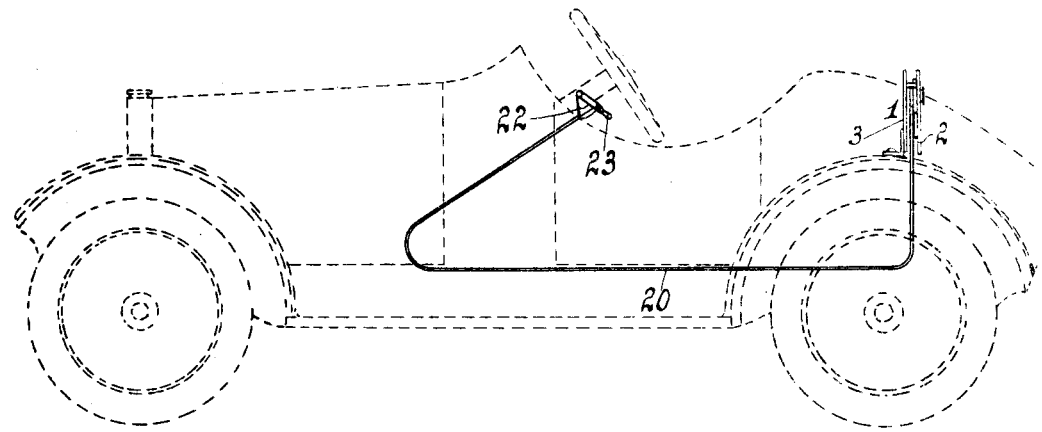
Figure 1 is a side view of an automobile with my signal mounted thereon.

In the drawings 1 indicates a frame which comprises a rear plate 3 and a front plate 2 which plates are connected together but spaced a short distance apart by pins 4, 5 and 6. The outline of said plates may be in the form of the body and head of a police officer. Said frame is mounted on the rear left fender of the automobile. A signal arm 7 is made in the form of a human arm in two members, an upper member 8 and a lower member 9, which members are pivoted together at the elbow by pivot 10 and the arm is pivoted to the upper part of the frame 1 between the plates 2 and 3 on the pin 4 which extends through the upper end of the upper members 8 of the arm. On the inner end of arm member 9 are two shoulders 11 and 12 which are engaged by a pin 13 on the member 8 whereby the movement of the member 9 is limited when brought into straight alignment with member 8 or upwardly at right angles to said member. A rod 14 is connected at one end to the inner end of arm member 9 and extends through a bearing 15 at the upper end of the arm member 8. The other end of rod 14 is connected to one end of a cord 16, the other end of which cord is connected to the periphery of a drum 17 which is journaled on a shaft 18 between the upper part of the plates 2 and 3, which shaft is secured in the plate 3. A spring 19 surrounds the rod 14 between the bearing 15 and the end of said rod which is connected to the arm member 9. A flexible tube 20 is connected near one end by a stud 21 to the plate 2 between said plate and plate 3 and at its other end to the upper part of the steering post of the automobile, through which tube extends a Bowden wire 22, one end of which is connected to the drum 17 and its other end is connected to a lever 23 pivoted on said steering post just under the steering wheel. A spring contact 25 is secured to a block 26 of insulation which is secured between the plates 2 and 3 to the plate 2, which contact extends over the face of the drum 17 and normally engages a knob 27 of insulation on the face of said drum. In the rear wall 3 is mounted an electric lamp 30, one terminal of which is grounded on said plate. The other terminal of said lamp is connected to a spring contact 31 secured to the inside of the plate 3 under the base of said lamp, which contact engages the contact 25. A circular plate 32 is mounted a short distance from the rear of the plate 3 and lamp 30 on pins 33 projecting from said plate 3. The plate 32 may be in the form of a police officer's badge with a star 34 and openings 35 cut in the plate to form the star, through which openings the light of lamp 30 may be projected. A stop 36 is secured to the inside of plate 2 which engages a finger 37 on the upper end of arm member 8 and limits the upward movement of said arm member in a horizontal position.

A lead 40 is connected to the contact 25 and to one pole of a battery 41. A lead 42 is connected to the other pole of said battery and to the plate 3.

Figure 2:
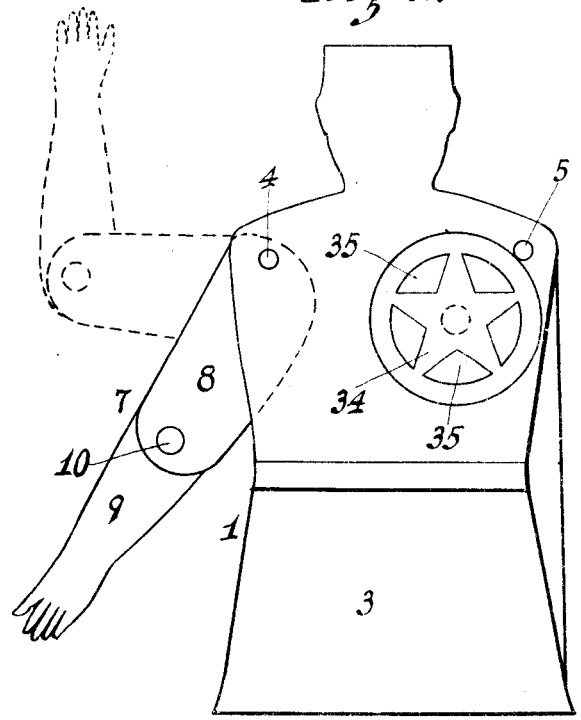
Figure 2 is a rear view of my signal.
Figure 3:
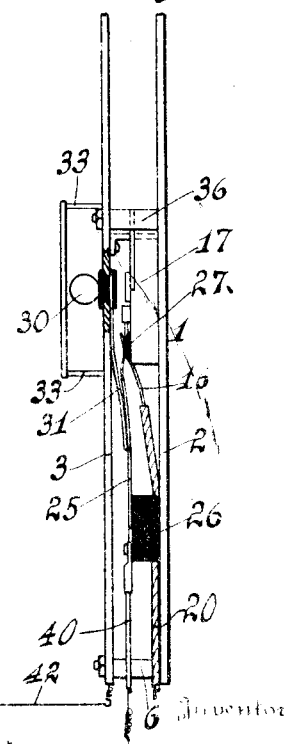
Figure 3 is an edge view of my signal.

In the operation of my signal the arm 7 is thrown into three different positions through the medium of lever 23, Bowden wire 22, drum 17 and cord 16, the first position being at an angle as shown in full lines in Figure 2 indicating Stop, the next position being horizontal indicating left turn, and the next position with the upper arm member 8 horizontal and the arm member 9 in vertical position as shown in dotted lines in Figure 2, indicating right turn, the arm member 8 being arrested in horizontal position by the engagement of finger 37 with stop 36. When the arm is swung into any of said positions the contact 25 engages the face of the drum 17 and closes the lamp passing from battery 41 through lead 40, contact 25, drum 17, frame 1 and lamp 30, and lead 42 back to battery. The lamp circuit may be controlled by a switch 45 interposed in the lead 42.

Having described by invention, I claim:

1. A signal including a frame, an arm formed of two members pivoted together, one of said members being pivoted to said frame and means for swinging said arm into an incline position, a horizontal position, or in a position with one member horizontal and the other member vertical.

2. A signal including a frame, an arm formed of two members pivoted together, one of said members being pivoted to said frame, means for swinging said arm into an incline position, a horizontal position, or in a position with one member horizontal and the other member vertical, an electric lamp and means for lighting said lamp when said arm is swung into any of said positions.

3. A signal including an arm formed of an upper and a lower member pivoted together, the upper member being pivoted to a frame, a rod connected to the pivoted end of the lower member, a bearing on the upper end of the upper member through which said rod extends, a spring surrounding said rod between said bearing and the end of the ber, means connected to the upper end of said rod for swinging the arm into an inclined position, a horizontal position, or in a position with the upper member horizontal and the lower member vertical, a finger on the upper member of the arm, a stop on said frame for engaging said finger to limit the movement of the upper member of the arm when the same reaches a horizontal position, two shoulders on the lower member and a pin on the upper member for engaging said shoulders to limit the lower member of the arm when the members are in alignment or when the upper member is horizontal and the lower member vertical.

4. A signal formed of an upper and a lower arm pivoted together and means for swinging both the upper and lower arms from an inclined position to a horizontal position, or to a position with the upper member horizontal and the lower member vertical.

5. A signal and arm made in two sections pivoted together and means for swinging both sections of said arms so that one section will be horizontal and the other section perpendicular thereto.

In testimony whereof I affix my signature.

WILLIAM E. BLAND.